(12) United States Patent
Oh (10) Patent No.: US 9,951,921 B2
(45) Date of Patent: Apr. 24, 2018

(54) VEHICLE TAILLIGHT SYSTEM

(71) Applicant: Se-Ho Oh, Osan (KR)

(72) Inventor: Se-Ho Oh, Osan (KR)

( * ) Notice: Subject to any disclaimer, the term of this patent is extended or adjusted under 35 U.S.C. 154(b) by 0 days.

(21) Appl. No.: 15/249,202

(22) Filed: Aug. 26, 2016

(65) Prior Publication Data

US 2018/0058655 A1 Mar. 1, 2018

(51) Int. Cl.
| | | |
|---|---|---|
| *F21V 29/00* | (2015.01) | |
| *F21S 8/10* | (2006.01) | |
| *B60Q 1/26* | (2006.01) | |
| *B60Q 1/44* | (2006.01) | |
| *B60Q 1/34* | (2006.01) | |
| *B60Q 1/52* | (2006.01) | |

(52) U.S. Cl.
CPC .......... *F21S 48/218* (2013.01); *B60Q 1/2607* (2013.01); *B60Q 1/34* (2013.01); *B60Q 1/447* (2013.01); *B60Q 1/52* (2013.01)

(58) Field of Classification Search
CPC ...... F21S 48/215; F21S 48/217; F21S 48/218; F21Y 2105/10–2105/18
See application file for complete search history.

(56) References Cited

U.S. PATENT DOCUMENTS

| | | | | |
|---|---|---|---|---|
| 6,837,602 B1* | 1/2005 | Lee | ...................... | B60Q 1/0052 362/330 |
| 7,866,865 B2* | 1/2011 | Wu | ......................... | B60Q 1/44 315/77 |
| 8,596,844 B1* | 12/2013 | Yeh | ....................... | F21S 48/215 362/507 |
| 2002/0034078 A1* | 3/2002 | Natsume | ............... | F21S 48/215 362/509 |
| 2003/0012034 A1* | 1/2003 | Misawa | ............... | B60Q 1/2607 362/545 |
| 2005/0062597 A1* | 3/2005 | Su | ........................ | B60Q 1/2665 340/475 |
| 2010/0124073 A1* | 5/2010 | Kowalczyk | .......... | B60Q 1/2607 362/545 |

* cited by examiner

*Primary Examiner* — Sean Gramling

(57) ABSTRACT

A vehicle taillight system being capable of representing various situations occurring upon driving a vehicle is provided. The vehicle taillight system includes: first and second taillights mounted at the rear of a vehicle; a plurality of light sources installed at each of the first and second taillights; and a controller connected to the first and second taillights and that controls the plurality of light sources to together or individually operate and that controls to output driving information of the vehicle to the outside of the vehicle through the first and second taillights. Therefore, because a driver's intention expression can be more clearly represented, various safety accidents can be beforehand prevented.

16 Claims, 9 Drawing Sheets

VEHICLE TAILLIGHT SYSTEM

BACKGROUND OF THE INVENTION

Field of the Invention

The present invention relates to a vehicle taillight system, and more particularly, to a vehicle taillight system provided at the rear of a vehicle to display a vehicle state.

Description of the Related Art

In general, a vehicle taillight is a lighting device provided at the rear of a vehicle to display vehicle information. The vehicle taillight may display basic driving information of the vehicle, such as a direction instruction and urgent situation occurrence.

A conventional vehicle taillight was already disclosed by "Korean Patent Laid-Open Publication No. 2008-0073596 (REAR LAMP FOR LEADING VEHICLES USING LED, Aug. 11, 2008)". The conventional vehicle taillight includes a lamp module having a plurality of light emitting diodes. The lamp module enables vehicle information according to a situation to display at the rear of the vehicle.

However, a conventional vehicle taillight may display only general vehicle information such as a direction instruction and urgent situation occurrence. Accordingly, in the conventional vehicle taillight, a driver's intention expression is limited. Therefore, it is difficult to represent various situations occurring upon driving a vehicle.

PRIOR ART DOCUMENT

Patent Document

Korean Patent Laid-Open Publication No. 2004-0068038 (TAILLIGHT FOR VEHICLE, Jul. 30, 2004)

SUMMARY OF THE INVENTION

The present invention has been made in view of the above problems and provides a vehicle taillight system being capable of representing various situations occurring upon driving a vehicle.

In accordance with an aspect of the present invention, a vehicle taillight system includes: first and second taillights mounted at the rear of a vehicle; a plurality of light sources installed at each of the first and second taillights; and a controller connected to the first and second taillights and that controls the plurality of light sources to together or individually operate and that controls to output driving information of the vehicle to the outside of the vehicle through the first and second taillights, wherein The first and second taillights may operate in at least one mode of a first mode representing a location of the vehicle by light emission of the plurality of light sources, a second mode representing an emergency situation of the vehicle by light emission of the plurality of light sources, a third mode representing a direction in which the vehicle is to be driven by light emission of the plurality of light sources, and a fourth mode representing a driver's intention expression by light emission of the plurality of light sources according to a signal provided from the controller.

The plurality of light sources may include a plurality of bar light sources emitting red light, and the plurality of bar light sources may include a first bar light source disposed within the housing, a second bar light source disposed at a lower portion of the first bar light source within the housing, a third bar light source disposed in one end direction of the second bar light source facing toward the inside of the vehicle from one end of the first bar light source facing toward the outside of the vehicle, and a fourth bar light source disposed in the other end direction of the second bar light source from the other end of the first bar light source to intersect the third bar light source.

The plurality of light sources may further include a plurality of circle light sources that emit yellow light, and wherein the circle light source may include: a first circle light source disposed at an upper area of an intersection of the third and fourth bar light sources at a lower portion of the first bar light source, a second circle light source disposed at a lower area of an intersection of the third and fourth bar light sources in an upper portion of the second bar light source, a third circle light source disposed in an inward direction of the vehicle from an intersection of the third and fourth bar light sources, and a fourth circle light source disposed in an outward direction of the vehicle from an intersection of the third and fourth bar light sources.

In the first mode, the first, second, and fourth bar light sources may emit together light, while the vehicle drives.

In the second mode, the third and fourth bar light sources may emit together light, when an emergency light manipulation unit of the vehicle is manipulated.

In the second mode, the plurality of bar light sources and the plurality of circle light sources may selectively emit light, when a brake of the vehicle is manipulated.

In the second mode, by enabling the plurality of bar light sources and the plurality of circle light sources to selectively emit light according to a brake manipulation velocity and strength of the vehicle, a following vehicle may recognize a stop velocity of the vehicle.

In the second mode, a brake manipulation velocity and strength of the vehicle may be divided into five levels, in a first level, the third and fourth bar light sources may emit together light, in a second level, third and fourth bar light sources and a first circle light source may emit together light, in a third level, third and fourth bar light sources and first and second circle light sources may emit together light, in a fourth level, third and fourth bar light sources and first to third circle light sources may emit together light, and in a fifth level, third and fourth bar light sources and first to fourth circle light sources may emit together light.

In the third mode, the second and fourth bar light sources may emit together light to represent a direction in which the vehicle is to be driven while the vehicle drives.

In the third mode, for visibility of the second and fourth bar light sources, the second and third circle light sources may additionally emit light. In the fourth mode, lower areas of the third and fourth bar light sources may emit light based on an intersection of the third and fourth bar light sources.

In the fourth mode, for visibility of the third and fourth bar light sources, the first to fourth circle light sources may additionally emit light.

In the fourth mode, the third and fourth bar light sources may emit light in a form "Λ".

In the fourth mode, upper areas of the third and fourth bar light sources may emit light based on an intersection of the third and fourth bar light sources.

In the fourth mode, for visibility of the third and fourth light sources, the first to fourth circle light sources may additionally emit light. In the fourth mode, the third and fourth bar light sources may emit light in a form "V".

(Advantages)

A vehicle taillight system according to an exemplary embodiment of the present invention can represent various situations occurring upon driving a vehicle. Therefore, because a driver's intention expression can be more clearly represented, various safety accidents can be beforehand prevented.

The effects of the present invention are not limited to the above-described effects and the other effects will be understood by those skilled in the art from the following description.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, an exemplary embodiment according to the present invention will be described in detail with reference to the attached drawings. However, it should be understood that the detailed description and specific examples while indicating preferred embodiments of the invention are given by way of illustration only since various changes and modifications within the spirit and scope of the invention will become apparent to those skilled in the art from this detailed description. In the drawing, shapes of elements may be exaggeratingly expressed for better description, and like reference numerals designate like elements throughout the specification.

Figure 1:
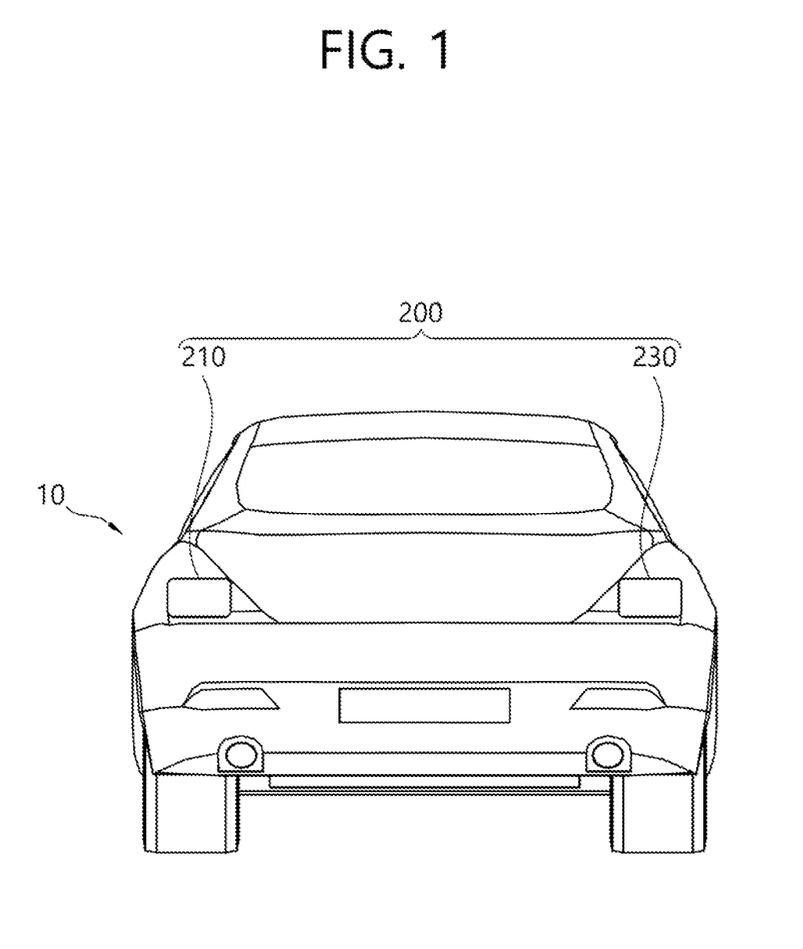
FIG. 1 is a rear view of a vehicle in which a vehicle taillight system is mounted according to an exemplary embodiment of the present invention.
Figure 2:
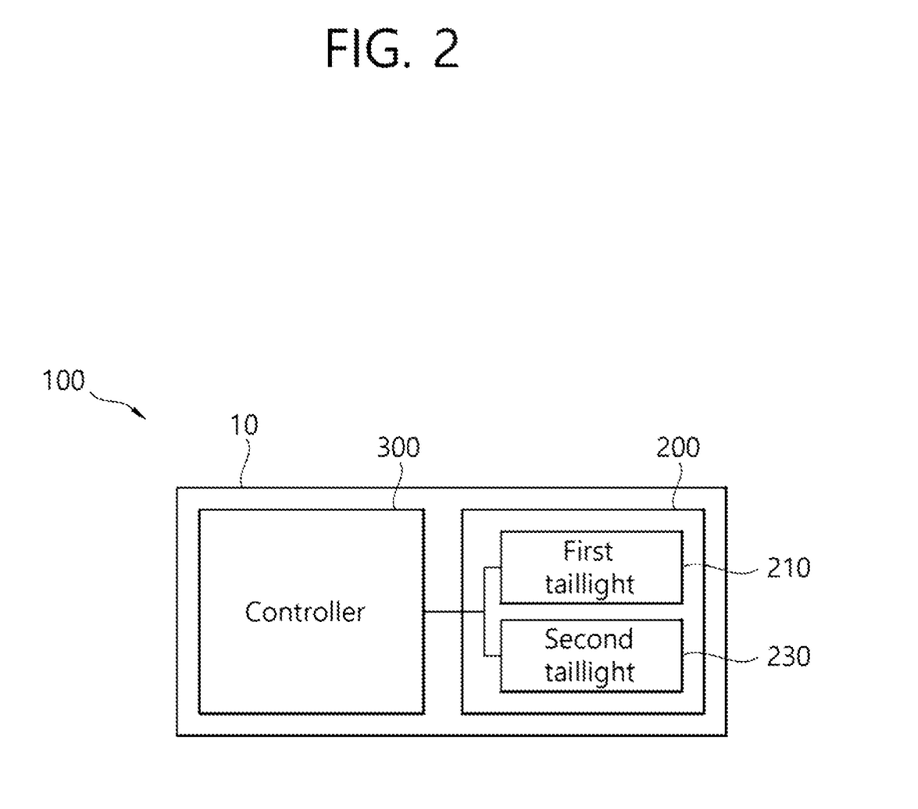
FIG. 2 is a block diagram illustrating a configuration of a vehicle taillight system according to an exemplary embodiment of the present invention.

FIG. 1 is a rear view of a vehicle in which a vehicle taillight system is mounted according to the present exemplary embodiment, and FIG. 2 is a block diagram illustrating a configuration of a vehicle taillight system according to the present exemplary embodiment.

As shown in FIGS. 1 and 2, a vehicle taillight system 100 according to the present exemplary embodiment includes a vehicle taillight 200. The vehicle taillight 200 may be provided in a pair at the rear of a vehicle 10. However, the number and a disposition structure of the vehicle taillight 200 are not limited thereto.

Hereinafter, the vehicle taillight 200 may be referred to as first and second taillights 210 and 230.

The first and second taillights 210 and 230 may be disposed at the left and right sides, respectively, of the rear of the vehicle 10. The first and second taillights 210 and 230 may be provided in the same configuration. Hereinafter, the first taillight 210 will be described in detail with reference to the attached drawings.

Figure 3:
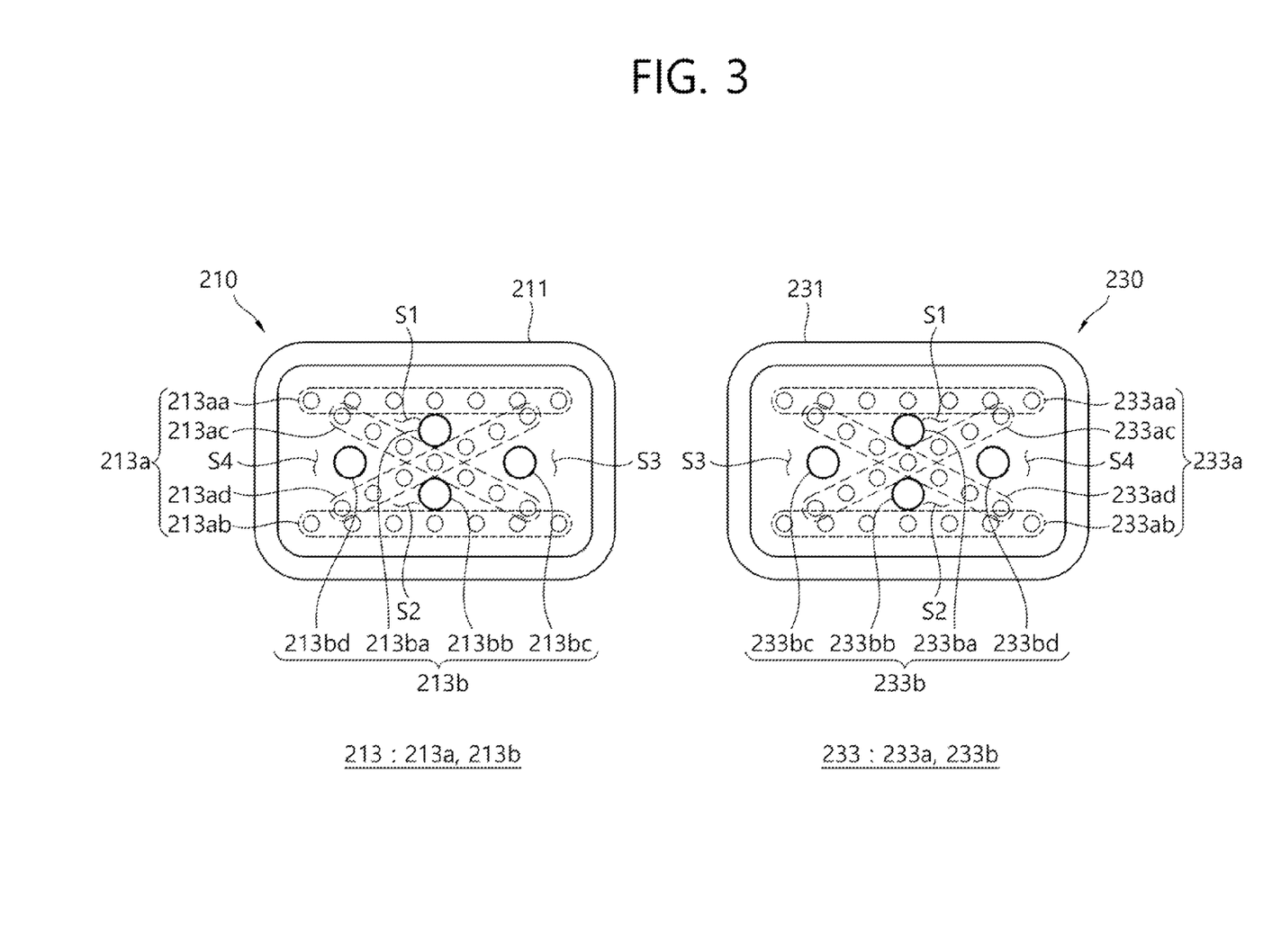
FIG. 3 is a diagram illustrating a vehicle taillight according to an exemplary embodiment of the present invention.

FIG. 3 is a diagram illustrating a vehicle taillight according to the present exemplary embodiment.

As shown in FIG. 3, the first taillight 210 according to the present exemplary embodiment may include a housing 211 and a plurality of light sources 213.

First, the housing 211 forms an external form of the first taillight 210. Here, the housing 211 may be made of a light transmitting material to expose light from a housed plurality of light sources 213 to the outside.

The plurality of light sources 213 are disposed within the housing 211 to operate according to a signal provided from a controller 300 within the vehicle 10. Here, the controller 300 may be provided with a manipulation unit previously installed within the vehicle 10 and a separately added manipulation unit.

The plurality of light sources 213 may include a bar light source 213a provided in a bar form and a circle light source 213b provided in a circle form.

First, the bar light source 213a emits red light. Here, the bar light source 213a may include first to fourth bar light sources 213aa-213ad.

The first bar light source 213aa is disposed at an upper portion within the housing 211. The second bar light source 213ab is disposed at a lower portion of the first bar light source 213aa within the housing 211. In this case, the first and second bar light sources 213aa and 213ab are disposed in a separated state.

The third and fourth bar light sources 213ac and 213ad may be disposed between the first and second bar light sources 213aa and 213ab. Here, the third and fourth bar light sources 213ac and 213ad may be disposed in an approximately form "X". For example, the third bar light source 213ac may be disposed in one end direction of the second bar light source 213ab facing toward the inside of the vehicle 10 from one end of the first bar light source 213aa facing toward the outside of the vehicle 10. The fourth bar light source 213ad may be disposed in the other end direction of the second bar light source 213ab from the other end of the first bar light source 213aa.

Such first to fourth bar light source 213aa-213ad each may include a plurality of LEDs. Here, a plurality of LEDs constituting the first to fourth bar light sources 213aa-213ad may emit together or individually light according to a signal provided from the controller 300. However, a kind of a light source constituting the first to fourth bar light sources 213aa-213ad is not limited thereto.

The circle light source 213b emits yellow light. Here, the circle light source 213b may include first to fourth circle light sources 213ba-213bd.

First, the first circle light source 213ba is disposed at an upper portion between the first and second bar light sources 213aa and 213ab. That is, the first circle light source 213ba may be disposed at an upper area S1 of an intersection of the third and fourth bar light sources 213ac and 213ad. The second circle light source 213bb is disposed at a lower portion between the first and second bar light sources 213aa and 213ab. That is, the second circle light source 213bb may be disposed at a lower area S2 of an intersection of the third and fourth bar light sources 213ac and 213ad.

Further, the third circle light source 213bc is disposed at an inner area S3 adjacent to the inside of the vehicle 10 between the first and second bar light sources 213aa and 213ab. The fourth circle light source 213bd is disposed at an outer area S4 adjacent to the outside of the vehicle 10 between the first and second bar light sources 213aa and 213ab.

The second taillight 230 includes a housing 231 and a plurality of light sources 223, similar to the first taillight 210. Here, the plurality of light sources 233 disposed within the housing 231 of the second taillight 230 may be provided in symmetry to a light source of the first taillight 210.

Hereinafter, a method of controlling a vehicle taillight system will be described in detail with reference to the attached drawings. However, a detailed description of the above-described constituent elements is omitted and constituent elements identical to or corresponding to those according to the foregoing exemplary embodiment are denoted by the same reference numerals.

Figure 4:
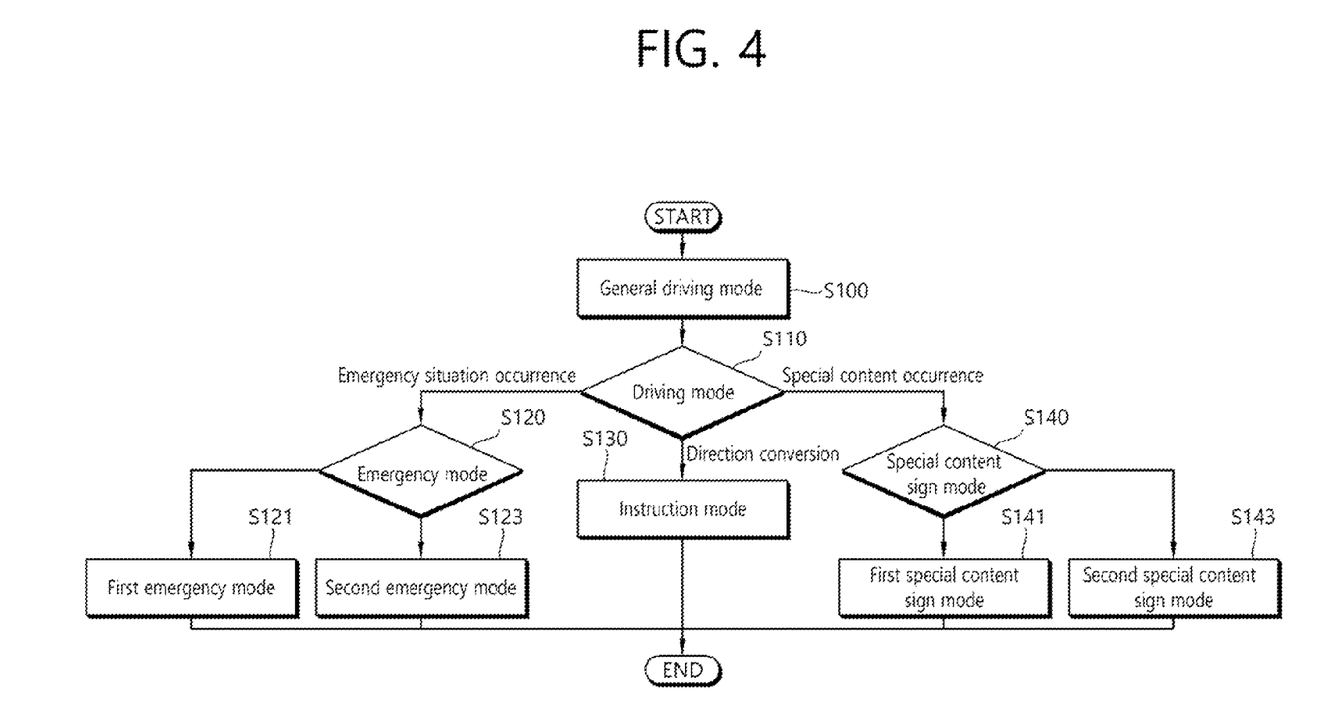
FIG. 4 is a flowchart illustrating a method of controlling a vehicle taillight system according to an exemplary embodiment of the present invention.

FIG. 4 is a flowchart illustrating a method of controlling a vehicle taillight system according to the present exemplary embodiment.

As shown in FIG. 4, in a method of controlling a vehicle taillight system according to the present exemplary embodiment, when the vehicle 10 drives, the vehicle 10 may operate in a general driving mode S100.

Thereafter, the vehicle taillight system 100 may be converted from the general driving mode S100 to a driving mode S110 according to a manipulation of the controller 300 by a driver.

Figure 5:
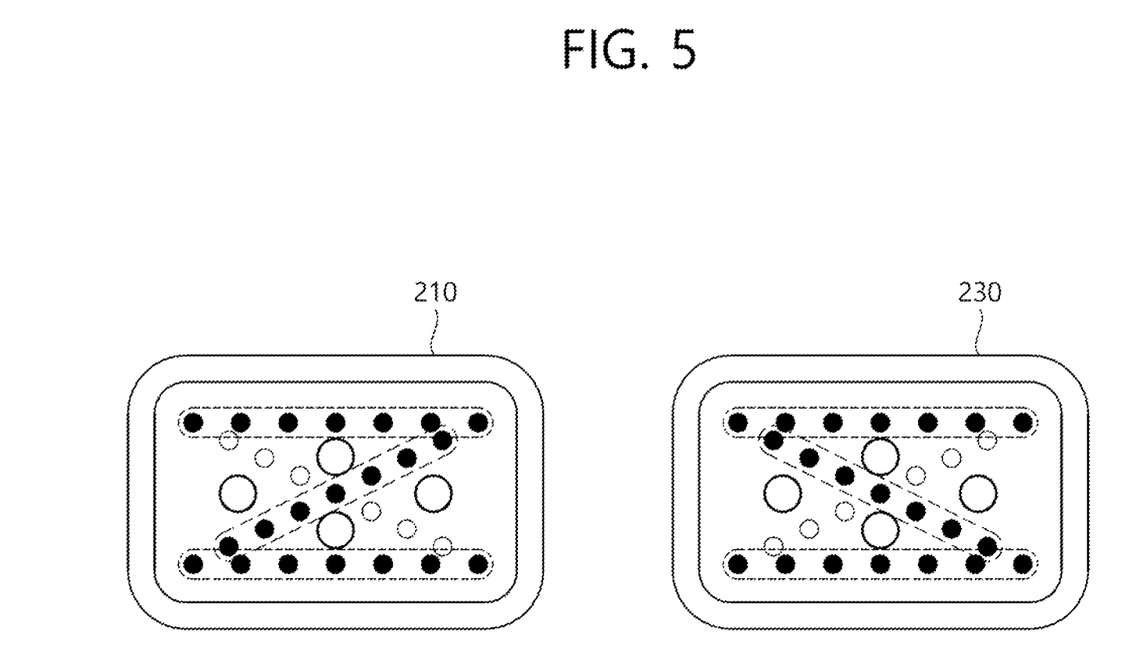
FIGS. 5 to 8 are diagrams illustrating operation of a vehicle taillight by a method of controlling a vehicle taillight system according to an exemplary embodiment of the present invention.

When representing a location of the vehicle 10 upon driving at day and night, the driving mode S110 may operate. In the driving mode S110, as shown in FIG. 5, the first taillight 210 may emit light in an approximately form "Z", and the second taillight 230 may emit light in symmetry to the first taillight 210. That is, in the driving mode S110, first, second, and fourth bar light sources 213*aa*, 213*ab*, 213*ad*, 233*aa*, 233*ab*, and 233*ad* of the first and second taillights 210 and 230 may emit light.

While the vehicle drives in the driving mode S110, the vehicle taillight system 100 may operate in an emergency mode S120 according to a manipulation of the controller 300 by the driver. The emergency mode S120 is distinguished into first and second emergency modes S121 and S123 to enable the vehicle taillight 200 to operate, as shown in FIG. 6.

Figure 6A:
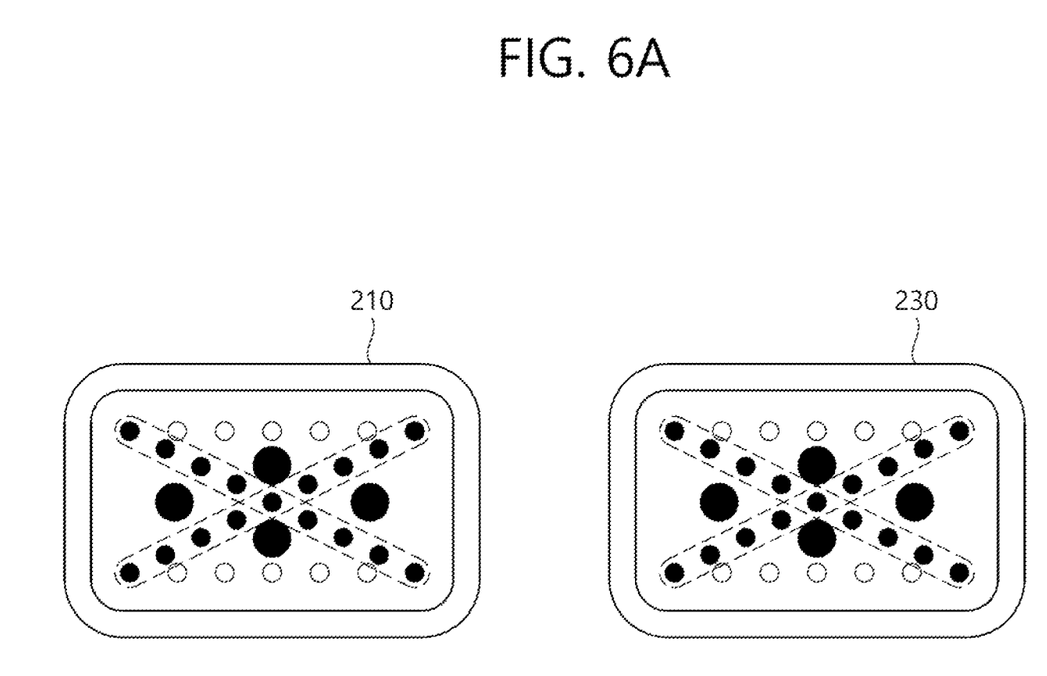

First, when the driver manipulates the controller 300, for example an emergency light manipulation unit, the first emergency mode S121 may operate. Here, the first emergency mode S121 enables the third and fourth bar light sources 213*ac*, 213*ad*, 223*ac*, and 233*ad* and first to fourth circle light sources 213*ba*-213*bd* and 233*ba*-233*bd* of the first and second taillights 210 and 230 to together flicker, as shown in FIG. 6A. Therefore, the first emergency mode S121 enables a following vehicle to intuitively recognize an emergency situation to assist quick coping of the following vehicle.

Figure 6B:
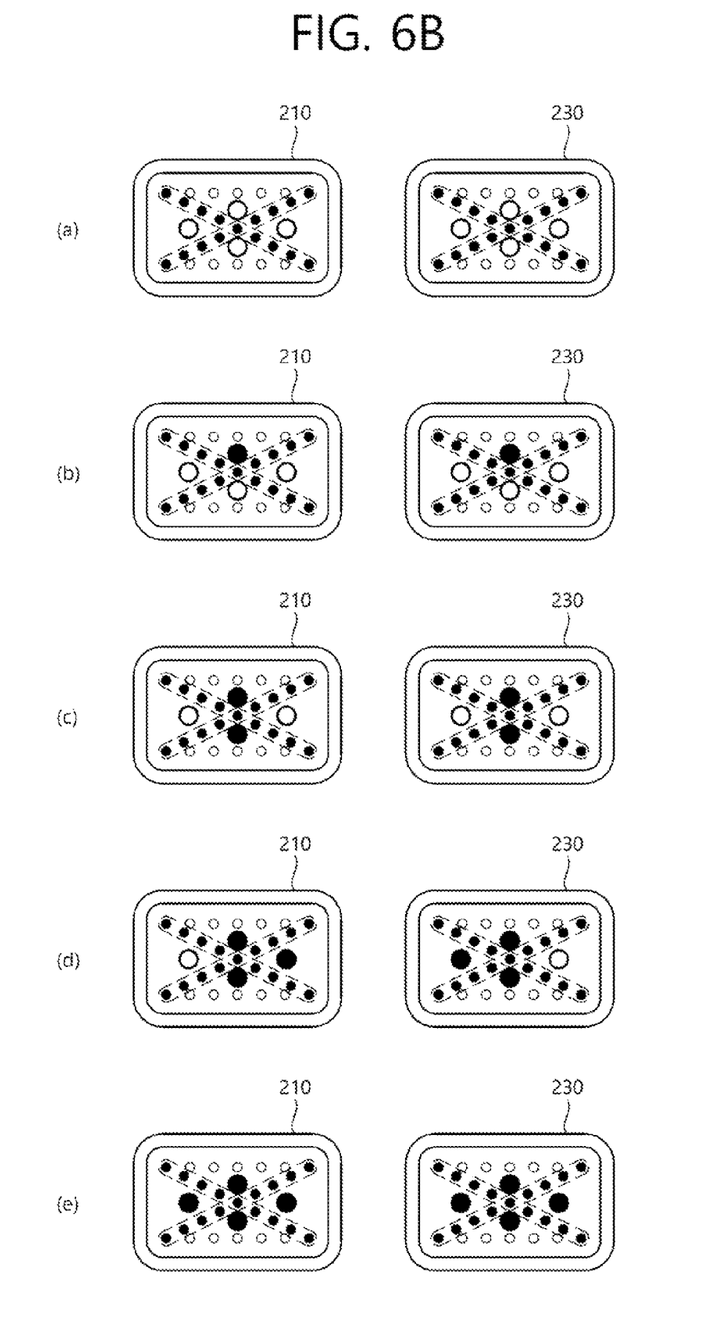

The second emergency mode S123 enables the bar light source 213*a* and the circle light source 213*b* to selectively emit light according to a manipulation velocity and strength of the brake when the driver manipulates the controller 300, for example a brake.

For example, as shown in FIG. 6B, the second emergency mode S123 divides a velocity and strength in which the driver steps on the brake into five levels and enables the first and second taillights 210 and 230 to emit light.

First, in the five levels, a first level is a level in which the driver steps on the brake with a relatively slowest velocity and lowest strength. In the first level, the third and fourth bar light sources 213*ac*, 213*ad*, 233*ac*, and 233*ad* of the first and second taillights 210 and 230 may enable to together emit light.

The second level may be a case in which the driver steps on a brake with a velocity faster and strength stronger than those of the first level. In the second level, the third and fourth bar light sources 213*ac*, 213*ad*, 233*ac*, and 233*ad* and the first circle light sources 213*ba* and 233*ba* of the first and second taillights 210 and 230 may enable to emit together light.

The third level may be a case in which the driver steps on a brake with a velocity faster than and strength stronger than those of the second level. In the third level, the third and fourth bar light sources 213*ac*, 213*ad*, 233*ac*, and 233*ad* and first and second circle light sources 213*ba*, 213*bb*, 233*ba*, and 233*bb* of the first and second taillights 210 and 230 may enable to emit together light.

The fourth level may be a case in which the driver steps on a brake with a velocity faster than and strength stronger than those of the third level. In the fourth level, the third and fourth bar light sources 213*ac*, 213*ad*, 233*ac*, and 233*ad* and the first to third circle light sources 213*ba*-213*bc* and 233*ba*-233*bc* of the first and second taillights 210 and 230 may enable to emit together light.

The fifth level may be a case in which the driver steps on a brake with a velocity faster than and strength stronger than those of the fourth level. In the fifth level, the third and fourth bar light sources 213*ac*, 213*ad*, 233*ac*, and 233*ad* and the first to fourth circle light sources 213*ba*-213*bd* and 233*ba*-233*bd* of the first and second taillights 210 and 230 may enable to emit together light.

In this way, the vehicle taillight 200 enables the following vehicle to intuitively recognize a stop velocity of the vehicle 10 to enable the following vehicle to easily cope.

The vehicle taillight system 100 may be converted from the driving mode S110 to an instruction mode S130 according to a manipulation of the controller 300 by the driver.

When the driver controls the controller 300, for example a direction instruction manipulation unit, such an instruction mode S130 may operate. That is, when converting a direction of the vehicle 10, the instruction mode S130 previously represents a direction in which the vehicle 10 is to be converted.

Figure 7:
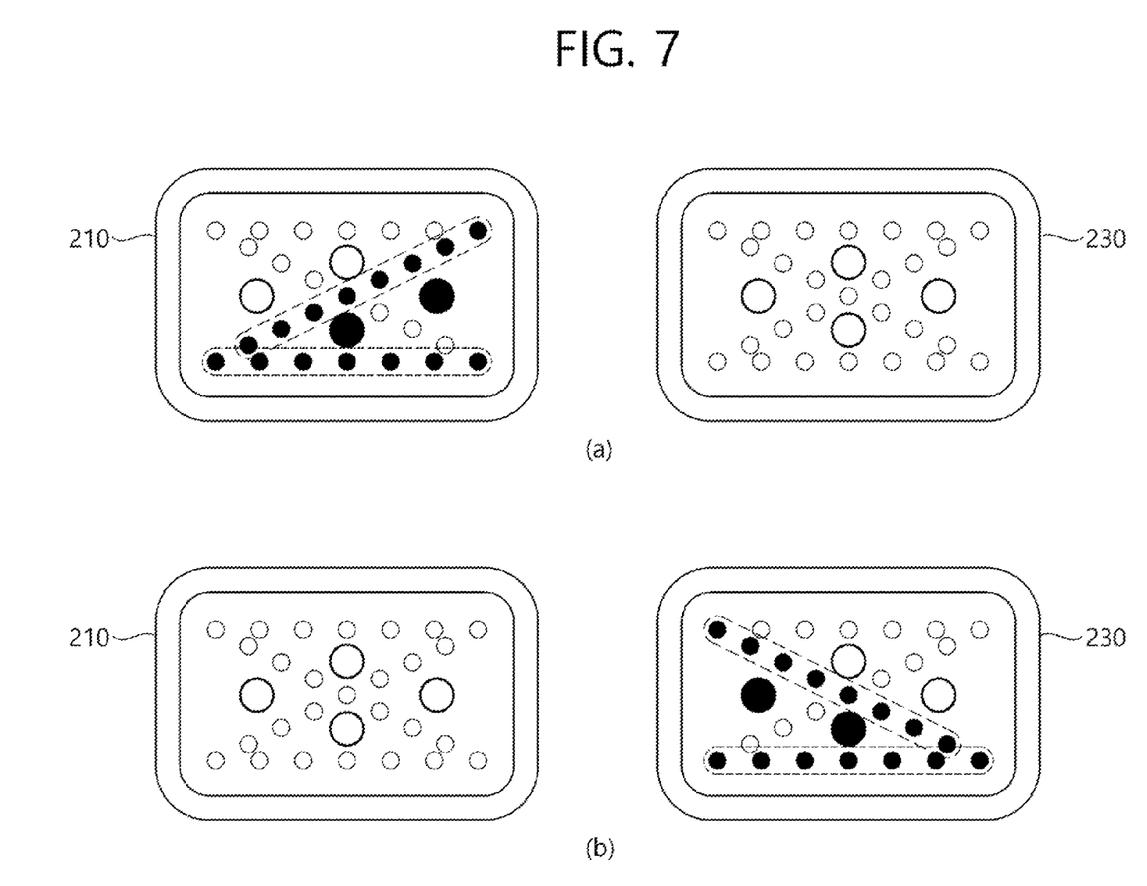

For example, when the vehicle 10 converts a direction to the left side, the second and fourth bar light sources 213*ab* and 213*ad* of the first taillight 210 emits light, as shown in FIG. 7A. Therefore, the vehicle 10 may previously instruct a direction to be converted. In this case, the second and third circle light sources 213*bb* and 213*bc* of the first taillight 210 additionally emit light to more improve visibility.

Further, when the vehicle 10 converts a direction to the right side, the second and fourth bar light sources 233*ab* and 233*ad* of the second taillight 230 emit light, as shown in FIG. 7B. Therefore, the vehicle 10 may previously instruct a direction to be converted. In this case, the second and third circle light sources 233*bb* and 233*bc* of the second taillight 230 additionally emit light to more improve visibility.

In this way, in the instruction mode S130, the vehicle 10 previously outputs a direction to convert in an arrow shape. Therefore, the following vehicle may previously intuitively recognize direction conversion of the vehicle 10.

The vehicle taillight system 100 may be converted from the driving mode S110 to a special content sign mode S140 according to a manipulation of the controller 300 by the driver. When the driver controls the controller 300, for example a manipulation unit separately installed within the vehicle 10, the special content sign mode S140 may operate.

Figure 8:
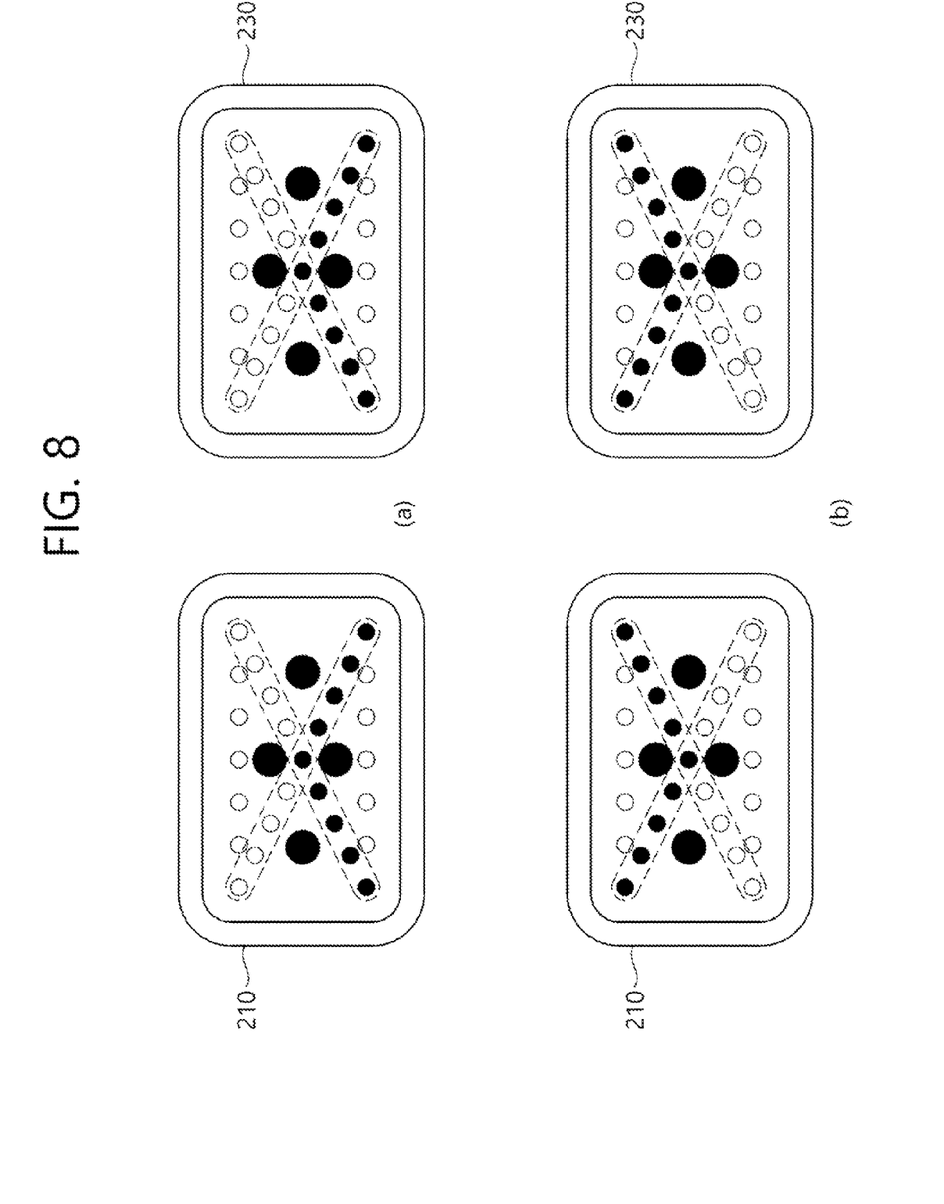

The special content sign mode S140 may include first and second special content sign modes S141 and S143.

In the first special content sign mode S141, the first to fourth circle light sources 213*ba*-213*bd* and 233*ba*-233*bd* of the first and second taillights 210 and 230 emit light, as shown in FIG. 8A. In this case, in the first and second taillights 210 and 230, a plurality of LEDs of the third and fourth bar light sources 213ac, 213ad, 233ac, and 233ad disposed at a lower area of an intersection of the third and fourth bar light sources 213ac, 213ad, 233ac, and 233ad emit light. Therefore, the first and second taillights 210 and 230 may enable red light of an approximately form "∧" to emit light. In this case, the first and second taillights 210 and 230 may be turned off after a predetermined time has elapsed.

When the driver obtains understanding from the following vehicle or expresses sorriness to the following vehicle, such a first special content sign mode S141 may be used.

In the second special content sign mode S143, as shown in FIG. 8B, the first to fourth circle light sources 213ba-213bd and 233ba-233bd of the first and second taillights 210 and 230 emit light. In the first and second taillights 210 and 230, a plurality of LEDs of the third and fourth bar light sources 213ac, 213ad, 233ac, and 233ad disposed at an upper area of an intersection of the third and fourth bar light sources 213ac, 213ad, 233ac, and 233ad emit light. Therefore, the first and second taillights 210 and 230 may enable red light of an approximately form "∨" to emit light. In this case, the first and second taillights 210 and 230 may be turned off after a predetermined time has elapsed.

When the driver expresses appreciation to the following vehicle, such a second special content sign mode S143 may be used.

In this way, in the special content sign mode S140, a problem of emergency light mixed use occurring when a conventional vehicle transfers a driver's intention expression through emergency light can be solved. Further, the special content sign mode S140 enables display of the driver's wide intention expression to settle a steady driving culture.

In this way, the vehicle taillight system can represent various situations occurring when driving the vehicle. Therefore, because a driver's intention expression can be more clearly represented, various safety accidents can be beforehand prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: vehicle taillight system
200: vehicle taillight
300: controller

What is claimed is:

1. A vehicle taillight system, comprising:
    first and second taillights mounted at the rear of a vehicle;
    a plurality of light sources installed at each of the first and second taillights; and
    a controller connected to the first and second taillights and that controls the plurality of light sources to together or individually operate and that controls to output driving information of the vehicle to the outside of the vehicle through the first and second taillights,
    wherein the first and second taillights operate in one or more modes of a first mode representing a location of the vehicle by light emission of the plurality of light sources, a second mode representing an emergency situation of the vehicle by light emission of the plurality of light sources, a third mode representing a direction in which the vehicle is to be driven by light emission of the plurality of light sources, and a fourth mode representing a driver's intention to a following vehicle by light emission of the plurality of light sources, according to a signal provided from the controller,
    wherein the plurality of light sources comprise a plurality of bar light sources emitting red light, and
    wherein the plurality of bar light sources comprise:
    a first bar light source disposed within the housing;
    a second bar light source disposed at a lower portion of the first bar light source within the housing;
    a third bar light source extending from one end of the second bar light source facing toward the inside of the vehicle to one end of the first bar light source facing toward the outside of the vehicle; and
    a fourth bar light source extending from the other end of the second bar light source to the other end of the first bar light source to intersect the third bar light source.

2. The vehicle taillight system of claim 1, wherein the plurality of light sources further comprise a plurality of circle light sources that emit yellow light, and
    wherein the circle light source comprises:
    a first circle light source disposed at an upper area of an intersection of the third and fourth bar light sources at a lower portion of the first bar light source, a second circle light source disposed at a lower area of an intersection of the third and fourth bar light sources in an upper portion of the second bar light source, a third circle light source disposed in an inward direction of the vehicle from an intersection of the third and fourth bar light sources, and a fourth circle light source disposed in an outward direction of the vehicle from an intersection of the third and fourth bar light sources.

3. The vehicle taillight system of claim 2, wherein in the first mode, the first, second, and fourth bar light sources emit together light, while the vehicle is driven.

4. The vehicle taillight system of claim 2, wherein in the second mode, the third and fourth bar light sources emit together light, when an emergency light manipulation unit of the vehicle is manipulated.

5. The vehicle taillight system of claim 2, wherein in the second mode, the plurality of bar light sources and the plurality of circle light sources selectively emit light, when a brake of the vehicle is manipulated.

6. The vehicle taillight system of claim 2, wherein in the second mode, by enabling the plurality of bar light sources and the plurality of circle light sources to selectively emit light according to a brake manipulation velocity and strength of the vehicle, a following vehicle recognizes a stop velocity of the vehicle.

7. The vehicle taillight system of claim 6, wherein in the second mode, a brake manipulation velocity and strength of the vehicle are divided into five levels,
    in a first level, the third and fourth bar light sources emit together light,
    in a second level, the third and fourth bar light sources and the first circle light source emit together light,
    in a third level, the third and fourth bar light sources and the first and second circle light sources emit together light,
    in a fourth level, the third and fourth bar light sources and the first to third circle light sources emit together light, and in a fifth level, the third and fourth bar light sources and the first to fourth circle light sources emit together light.

8. The vehicle taillight system of claim 2, wherein in the third mode, the second and fourth bar light sources emit together light to represent a direction in which the vehicle is to be driven while the vehicle is driven.

9. The vehicle taillight system of claim 8, wherein in the third mode, for visibility of the second and fourth bar light sources, the second and third circle light sources additionally emit light.

10. The vehicle taillight system of claim 2, wherein in the fourth mode, lower areas of the third and fourth bar light sources emit light based on an intersection of the third and fourth bar light sources.

11. The vehicle taillight system of claim 10, wherein in the fourth mode, for visibility of the third and fourth bar light sources, the first to fourth circle light sources additionally emit light.

12. The vehicle taillight system of claim 2, wherein in the fourth mode, the third and fourth bar light sources emit light in a form "/\".

13. The vehicle taillight system of claim 2, wherein in the fourth mode, upper areas of the third and fourth bar light sources emit light based on an intersection of the third and fourth bar light sources.

14. The vehicle taillight system of claim 13, wherein in the fourth mode, for visibility of the third and fourth light sources, the first to fourth circle light sources additionally emit light.

15. The vehicle taillight system of claim 2, wherein in the fourth mode, the third and fourth bar light sources emit light in a form "\/".

16. The vehicle taillight system of claim 1, wherein the driver's intention includes expressing appreciation or apology to the following vehicle.

* * * * *